United States Patent [19]
Stagnitto et al.

[11] Patent Number: 5,945,798
[45] Date of Patent: Aug. 31, 1999

[54] SYSTEM FOR DETERMINING PART PRESENCE AND GRIP PRESSURE FOR A ROBOTIC GRIPPING DEVICE

[75] Inventors: Joseph E. Stagnitto, Rochester; Camiel J. Raes, Phelps; James A. White, Conesus, all of N.Y.

[73] Assignee: Eastman Kodak Company, Rochester, N.Y.

[21] Appl. No.: 09/141,379

[22] Filed: Aug. 27, 1998

[51] Int. Cl.[6] .................................. B25B 1/44; B25J 9/18
[52] U.S. Cl. ............................. 318/568.11; 318/568.21; 901/32; 294/97; 294/110.1
[58] Field of Search .............................. 294/99.1, 93, 97, 294/106, 110.1, 119.1; 901/30–38; 318/568.11, 568.16, 568.21

[56] References Cited

U.S. PATENT DOCUMENTS

| | | | |
|---|---|---|---|
| 3,272,347 | 9/1966 | Lemelson . | |
| 3,759,563 | 9/1973 | Kutamura | 294/88 |
| 3,845,284 | 10/1974 | Taguchi et al. | 235/150.1 |
| 3,851,769 | 12/1974 | Noguchi et al. | 214/1 BC |
| 3,888,362 | 6/1975 | Fletcher et al. | 214/1 B |
| 3,941,988 | 3/1976 | Hagstrom | 364/474.29 |
| 4,533,167 | 8/1985 | Johnson | 294/86.4 |
| 4,579,380 | 4/1986 | Zaremsky et al. | 294/119.1 |
| 4,593,948 | 6/1986 | Borcea et al. | 294/88 |
| 4,653,793 | 3/1987 | Guinot et al. | 294/86.4 |
| 4,682,089 | 7/1987 | Tamari | 318/563 X |
| 4,870,333 | 9/1989 | Itoh et al. | 318/286 |
| 4,878,705 | 11/1989 | Arnquist | 294/116 |
| 4,956,790 | 9/1990 | Tsuchihashi et al. | 364/513 |
| 4,976,484 | 12/1990 | Nomaru et al. | 294/119.1 |
| 4,985,846 | 1/1991 | Fallon | 382/153 |
| 5,100,285 | 3/1992 | Wagner | 414/744.8 |
| 5,165,828 | 11/1992 | Green et al. | 408/129 |
| 5,200,679 | 4/1993 | Graham | 901/32 X |
| 5,215,923 | 6/1993 | Kinoshita et al. | 436/47 |
| 5,239,246 | 8/1993 | Kim | 318/568.11 |
| 5,253,911 | 10/1993 | Egan et al. | 294/116 |
| 5,280,981 | 1/1994 | Schulz | 294/106 |
| 5,541,485 | 7/1996 | Teichmann et al. | 318/568.21 |
| 5,671,962 | 9/1997 | Otsuka et al. | 294/119.1 |

*Primary Examiner*—Brian Sircus
*Attorney, Agent, or Firm*—Mark G. Bocchetti

[57] ABSTRACT

A method for determining if a robot gripper assembly (preferably servo controlled) has acquired a work piece wherein the robot gripper assembly includes at least two opposing fingers comprising the steps of commanding the robot gripper assembly to close the two opposing fingers to a predetermined position to acquire the work piece, the predetermined position being less than or different than the expected work piece dimension; quantifying the movement of the two opposing fingers when the closing step has been completed; comparing the actual position to the predetermined position to determine a position error; and recognizing that a work piece has been acquired by the two opposing fingers if the position error is not zero indicating that the interference of the work piece between the two opposing fingers has prevented the two opposing fingers from achieving the predetermined position.

18 Claims, 5 Drawing Sheets

SYSTEM FOR DETERMINING PART PRESENCE AND GRIP PRESSURE FOR A ROBOTIC GRIPPING DEVICE

FIELD OF THE INVENTION

The present invention relates generally to robotic gripping devices and, more particularly, to systems used in conjunction with such robotic gripping device to detect part presence and grip force.

BACKGROUND OF THE INVENTION

There are a variety of known robotic gripping devices in the prior art. These robotic gripping devices includes systems which may be pneumatically, hydraulically, or motor controlled. Typically, current robotic applications use a sensor mounted within the gripper assembly to detect part or work piece presence. That sensor or an additional sensor may be used to measure the grip pressure being exerted by the robotic gripper assembly. This is particularly true in applications where the robot gripper assembly is servo controlled. For example, U.S. Pat. No. 5,671,962 to Otsuka et al teaches a bi-finger robot gripping assembly wherein the robot controller receives a signal from a work detector attached to one of the fingers. The signal of the work detector indicates whether or not a work piece exists between the fingers. In operation, the controller calculates an output torque of the servomotor necessary for obtaining a computed optimum holding force on the basis of reference tables stored in memory and controls the servomotor accordingly.

U.S. Pat. No. 4,579,380 to Zaremsky et al teaches force servoing of an electric motor powered robot gripper. Force servoing is accomplished by providing a force transducer integral with one or more mounting blocks for monitoring the load exerted on one of the gripping fingers through a pivot and lever action of the mounting bracket positioned adjacent to the force transducer. An optical shaft encoder provides precise position information for position servoing tasks and a limit switch, located above one of the finger mounting blocks, is used to identify a known marker pulse on the encoder and serves to protect the device from damage which might occur from moving the blocks beyond the positions for which the device is designed.

U.S. Pat. No. 4,533,167 to Johnson teaches a robotics manipulator arrangement having a control system which allows the manipulator to be controlled with respect to the gripping force applied to an object. Johnson's arrangement utilizes a fluid pressure source such as a pneumatic source, a transducer responsive either to pressure or flow, and the variable fluid flow restriction means which is variable in response to the gripping force. The force is generated by the robotics manipulator gripping an object and varying the restriction means so that a changing fluid pressure can be sensed and used for control purposes.

The prior art fails to teach a robotic gripping system and method wherein work piece detection and gripper force can be determined without the addition of detectors/sensors, or the interface components required to interface such detectors/sensors with the robotic controller.

SUMMARY OF THE INVENTION

It is therefore an object of the present invention to provide a method for determining part acquisition by opposing fingers in a robotic gripping apparatus by comparing the commanded spacing between the opposing fingers and the actual spacing between the opposing fingers.

It is a further object of the present invention to provide a method and system for using a servo controlled robotic gripping apparatus which can determine part presence without incorporation of a sensor/detector for that purpose.

Another object of the present invention is to provide a servo controlled robot gripping apparatus which can control and/or monitors grip force applied to work piece without the incorporation of a sensor/detector in the apparatus.

Still another object of the present invention is to provide a servo controlled robot gripping apparatus which can be used to determine part or work piece dimension without a sensor/detector specific to that purpose.

Briefly stated, the foregoing and numerous other features, objects and advantages of the present invention will become readily apparent upon a reading of the detailed description, claims and drawings set forth herein. These features, objects and advantages are accomplished using the servo control system of the robotic gripping apparatus. When a servomotor is commanded to a predetermined position by the servo controller, an offset proportional to the difference between the "commanded position" and the "actual position" is called position error. This position error is the result of the position feedback sensor response indicating that the servo mechanism did not achieve the commanded position. The position of the servo is commanded to be such that the grippers will attempt to close beyond the expected part dimension and should stop on the part due to force limiting control by some method such as limiting the maximum current to the motor. If interference occurs, that is if a part is actually grasped, a position error will result and this position error can be used to indicate part presence and grip force. The lack of a position error may indicate that a part was not grasped by the gripper for assembly since the servo mechanism was able to achieve a position that closed the grippers to a position or spacing that was less than the minimum part dimension. If a position error is observed a part is present. Further, the magnitude of the grip force can be controlled by controlling the servomotor current with the controller software. Further, a properly calibrated system could use the "actual position" of the gripper to determine the dimension of the part currently being grasped. Operationally, the robot control system commands the gripper to close to a position slightly less than the expected part dimension. The interference of the grasping of the part prevents achieving the commanded position which results in a limited force applied to the fingers allowing the part to be held securely therebetween. After the grasp takes place, the robot control system determines if the actual position correlates appropriately to the expected part dimension. Operating in this manner would require that the robot control system have the part's dimensions in memory.

DETAILED DESCRIPTION OF THE INVENTION

Figure 1:
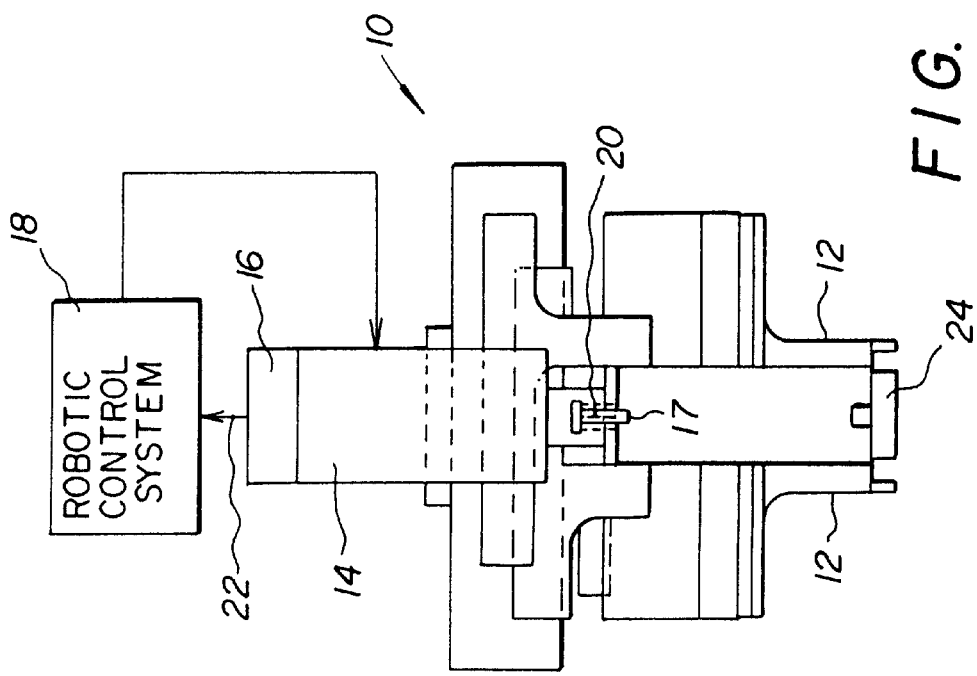
FIG. 1 is a front elevational schematic of a robotic gripper assembly connected to a robot control system wherein the fingers of the gripper assembly are in position to acquire a work piece.

Turning first to FIG. 1 there is shown an elevational view of a robotic gripper assembly 10. Robotic gripper assembly 10 includes at least 2 opposing fingers 12 the movement of which driven by servomotor 14. Connected to the shaft 17 of servomotor 14 is an encoder 16. Operation of servomotor 14 is controlled by robotic control system or microprocessor 18. Servomotor 14 may be operated bi-directionally thereby driving the rack and pinion assembly 20 from which opposing fingers 12 extend. In such manner, servomotor 14 can move opposing fingers 12 away from and toward one another. During rotation of motor 14, encoder 16 sends encoder pulses to the microprocessor 18 allowing the microprocessor 18 to calculate the distance traveled by opposing fingers 12 and thus the actual position or spacing between opposing fingers 12. The encoder pulses are transmitted via encoder wires 22. As depicted in FIG. 1, opposing fingers 12 are shown in a position ready to grasp a work piece or part 24.

Figure 2:
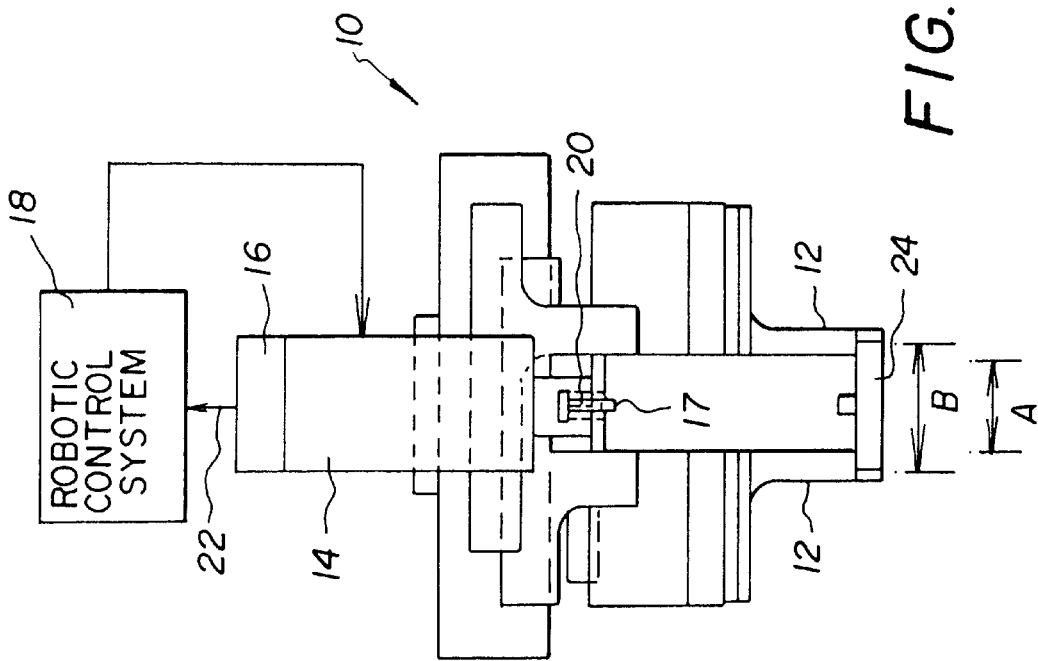
FIG. 2 is a front elevational schematic of a robotic gripper assembly connected to a robot control system wherein a work piece has been acquired by the fingers of the gripper assembly.
Figure 3:
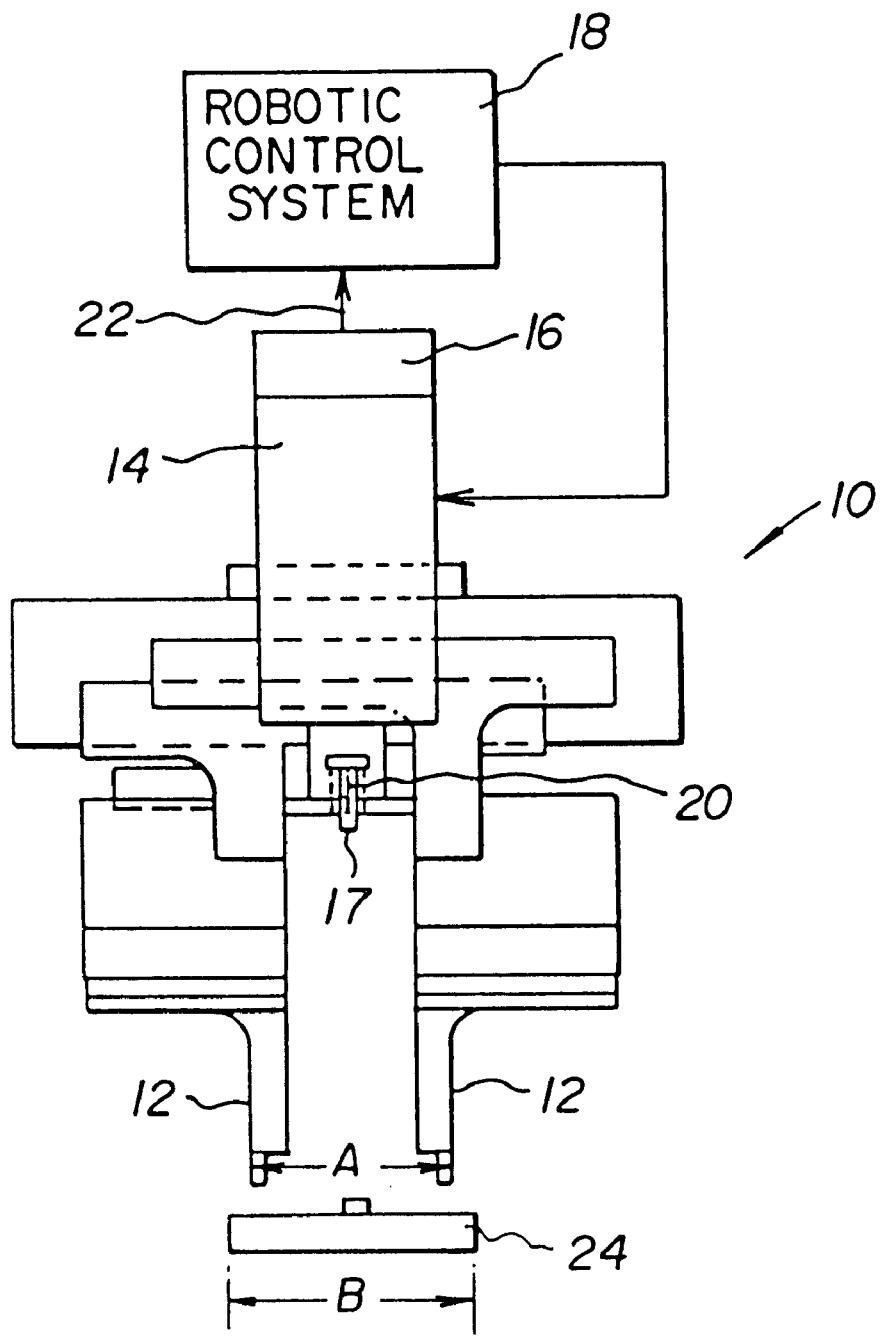
FIG. 3 is a front elevational schematic of a robotic gripper assembly connected to a robot control system wherein the fingers of the gripper assembly have failed to acquire the work piece.

In the operation of the method of the present invention, the microprocessor 18 commands the robotic gripper assembly 10 to close to a predetermined position or spacing A which is slightly less than the expected part dimension of work piece 24. In such manner, the interference of grasping work piece 24 prevents opposing fingers 12 from achieving the predetermined position commanded by the microprocessor 18. This results in a limited force being applied by opposing fingers 12 to the work piece 24 thereby holding it securely. After the grasp has been achieved by fingers 12, the microprocessor 18 determines a position error which is equal to the difference of the amount of encoder counts necessary to get to the predetermined position A versus the amount of encoder counts to get to the actual position B. In this example, of course, the dimension of work piece 24 is stored within the memory of microprocessor 18. Each encoder count is, of course, translatable to an actual distance value. If opposing fingers 12 are actually moved to the predetermined position A, than the position error is equal to zero which allows the microprocessor to recognize that a work piece 24 has not been grasped between opposing fingers 12. As depicted in FIG. 2, opposing fingers 12 have obtained a work piece 24 after servomotor 14 has been commanded by microprocessor 18 to move to a predetermined position or spacing A which is less than the known part dimension B. Thus, as depicted in FIG. 2, because work piece 24 has been acquired between opposing fingers 12, such that opposing fingers 12 have only attained an actual position or spacing of B, there is a position error which is the difference between position A and position B thereby indicating to the microprocessor that work piece 24 has been grasped between opposing fingers 12. On the other hand, as depicted in FIG. 3, opposing fingers 12 have been driven by servomotor 14 all the way to position or spacing A. By achieving the predetermined position A, the actual position and the predetermined position A are equal indicating that the position error is zero allowing the microprocessor 18 to recognize that work piece 24 has not been grasped between opposing fingers 12.

If the dimension of a work piece 24 is not known, it is possible to command the robotic gripper assembly 10 to close opposing fingers 12 until a certain "position error" is surpassed, which is proportional to gripper force caused by work piece interference. The actual position would then be the part dimension. This, of course, would require a properly calibrated servo system operating from a known initial starting position.

Figure 4:
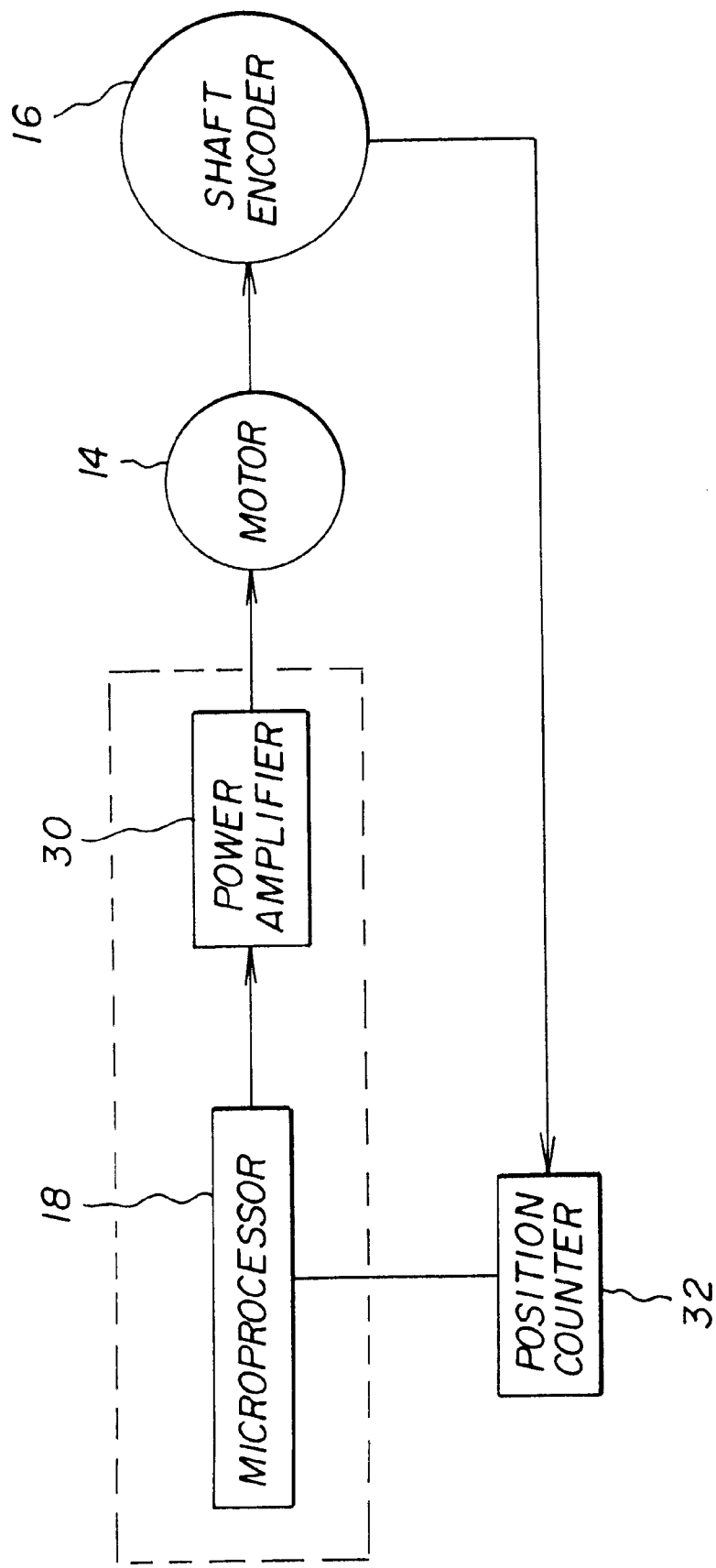
FIG. 4 is a schematic representation of a basic servo system which can be used to control a robotic gripper assembly.

Turning next to FIG. 4, there is shown a schematic of a basic servo system which can be used to control the robotic gripper assembly 10. Microprocessor 18 represents the intelligent controller of the system which output commands for motion through a power amplifier 30. The power amplifier 30 converts the microprocessor's low voltage commands into a signal of proper proportion to drive the servomotor 14. As the servomotor 14 rotates, the shaft encoder 16 delivers a pulse train or a series of pulses proportional to the amount of rotation. The pulse train is directed to a position counter 32 which is monitored by the microprocessor 18. The microprocessor 18 can then calculate the position error between the predetermined position and the actual position of the gripper fingers as a difference between the number of encoder pulses necessary to achieve the predetermined position versus the number of encoder pulses actually transmitted to the position counter 32.

Figure 5:
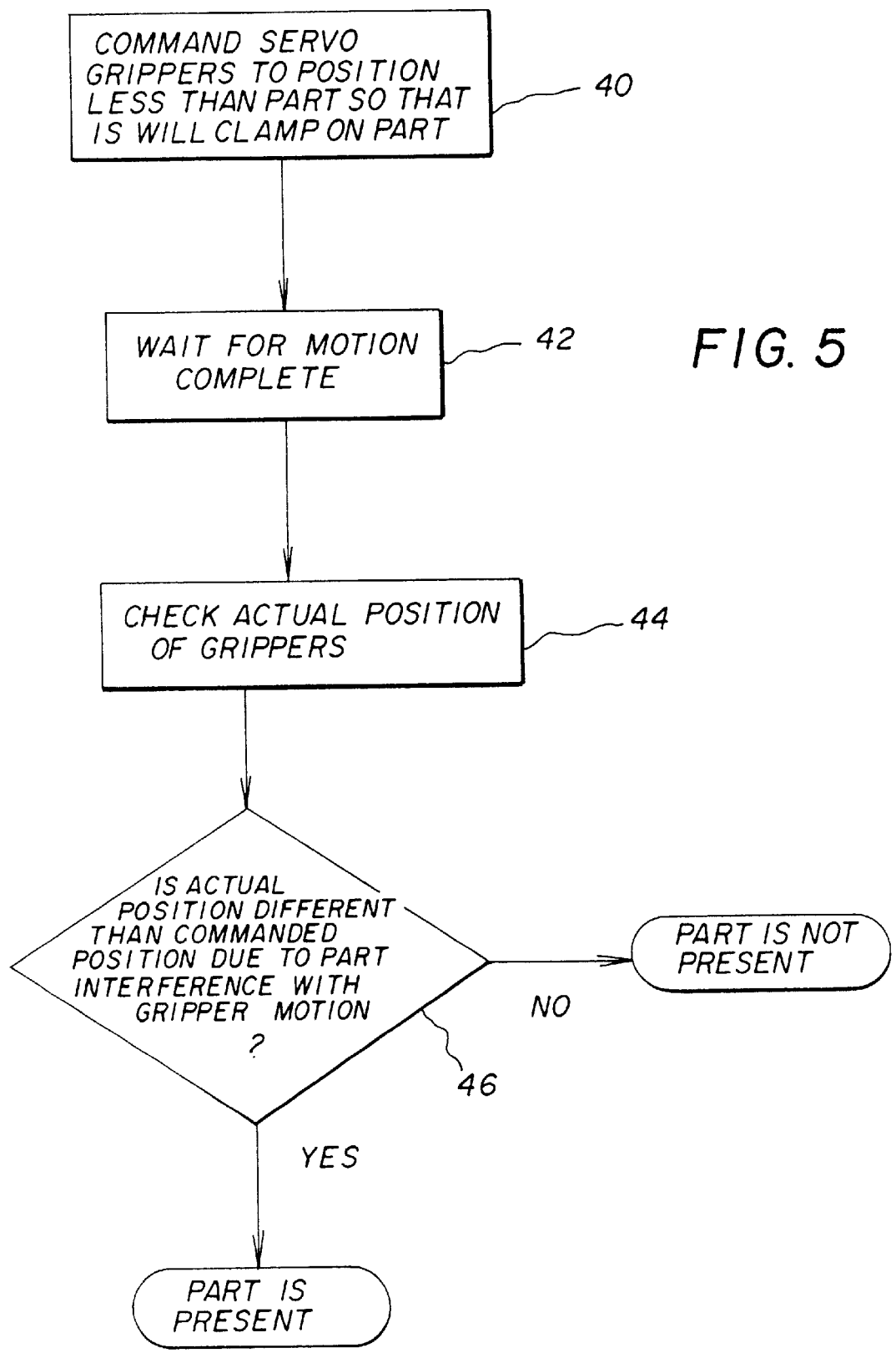
FIG. 5 is a logic diagram for the software used in the practice of the method of the present invention to determine whether or not the gripper assembly has actually acquired a work piece.

Turning next to FIG. 5, there is shown a logic diagram for the software used in the practice of the method of the present invention. This logic diagram is simplified such that it begins with the robotic gripper assembly 10 and already positioned proximate to work piece 24. In other words, the robotic arm has already been manipulated to place the robotic gripper assembly 10 in position to grasp work piece 24. At this point, as shown in function block 40, a command is issued to the servomotor 14 to close opposing fingers 12 to a predetermined position where the spacing therebetween is less than the expected part dimension so that opposing fingers 12 will clamp on the work piece 24. As shown by function block 42, the robotic control system 18 then waits for the clamping motion of the opposing fingers 12 to be completed. When the clamping motion of the opposing fingers 12 has been completed, the robotic control system 18 then determines the actual position of the opposing fingers 12 which can be determined as a result of the number of encoder pulses transmitted to the robot control system 18. This is shown by function block 44. The robotic control system 18 must then determine whether the actual position attained by the opposing fingers 12 is different from the predetermined position as a result of interference from a work piece 24 with the motion of opposing fingers 12 as indicated by decision block 46. If the answer to this inquiry is no then a part is not present. If the answer to this inquiry is yes then a part is present.

Figure 6:
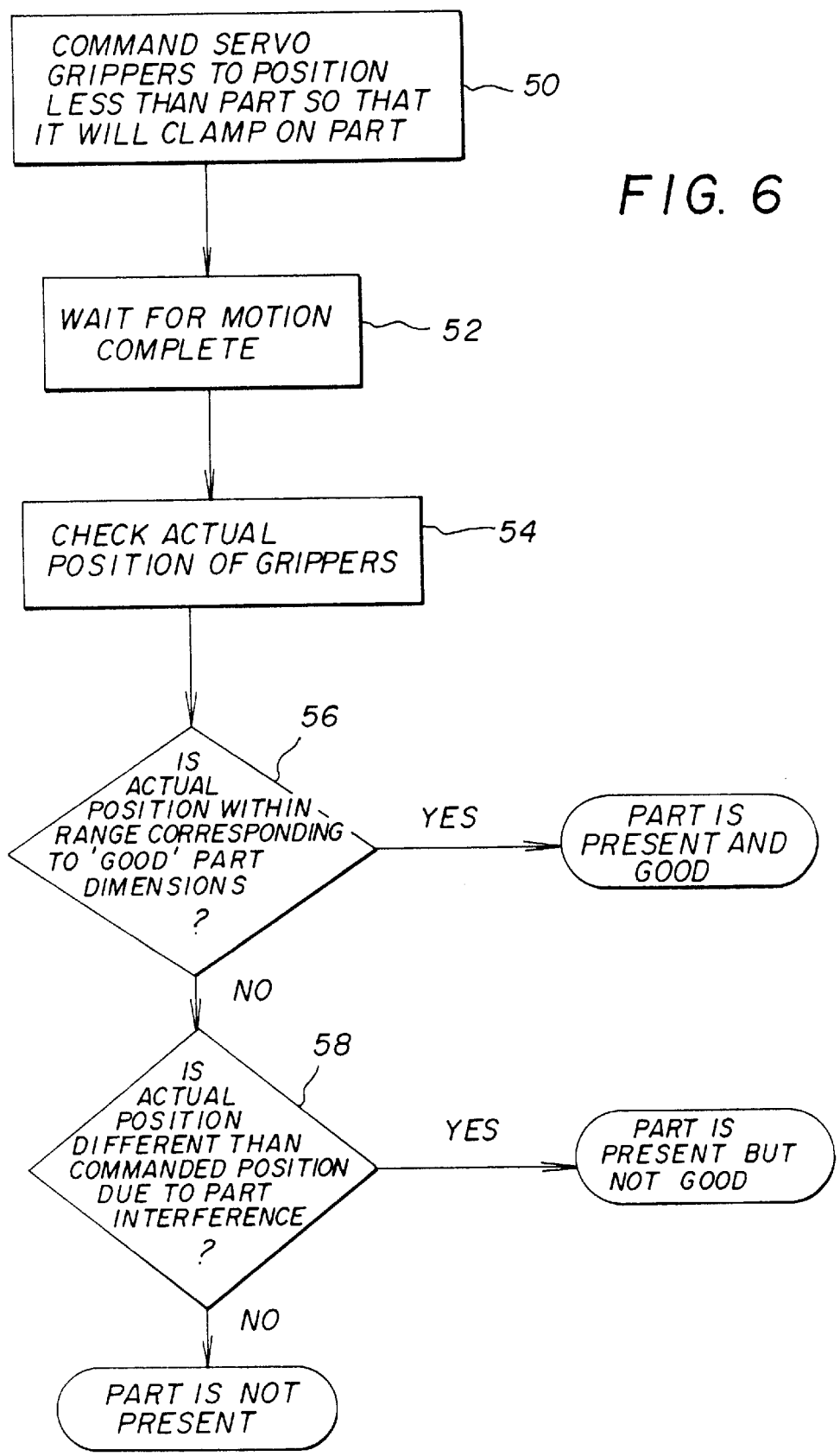
FIG. 6 is a logic diagram for the software used in the practice of the method of the present invention both to determine whether or not a work piece has been successfully grasped by the gripper assembly and to determine if the work piece is within specified dimensional tolerances.

Looking next at FIG. 6, there is shown of a logic diagram for the practice of the method of the present invention wherein the method is used both to determine both whether or not a work piece 24 has been successfully grasped between opposing fingers 12 and also to determine if the part or work piece 24 is within specified dimensional tolerances. Again the logic diagram is simplified such that it begins with the assumption that the robotic control system has already moved the robotic arm such that the opposing fingers 12 are in position to grasp a work piece 24. At this point, as described in function block 50, servomotor 14 is commanded by the robotic control system 18 to cause opposing fingers 12 to move to a predetermined position or spacing which is less than the lower limit of an acceptable specified dimensional range of tolerance for the particular work piece 24. Once again as described in function block 52, the robotic control system 18 waits for motion of opposing fingers 12 to be completed which is determined by a servomotor 14 stopping rotation, this, of course, stops the stream of encoder pulses transmitted to the robotic control system 18. When motion of the opposing fingers 12 has been completed, the robotic control system then determines the actual position or spacing of opposing fingers 12 as shown in function block 54. At that point, the robotic control system 18 determines whether the actual position attained by opposing fingers 12 is within the dimensional tolerance range for that particular work piece 24 as indicated by decision block 56. If the answer to this inquiry is yes than a work piece 24 has successfully been grasped between opposing fingers 12 and the work piece 24 is within dimensional tolerances. If the answer to this inquiry is no than the robotic control system determines whether or not the actual position attained by opposing fingers 12 is different from the predetermined position as shown by decision block 58. If the answer to this inquiry is yes than the work piece 24 has been successfully grasped between opposing fingers 12 but the work piece 24 is not within acceptable dimensional tolerances. If the answer to this inquiry is no than a work piece 24 has not been successfully grasped between opposing fingers 12.

In the practice of the method of the present invention, the predetermined position to which opposing fingers 12 are directed to close will, of course, depend upon the expected work piece dimension. Further, the difference between the expected work piece dimension and the predetermined position to which the opposing fingers 12 are directed to clamp may be determined empirically depending on the particular gripper assembly and the particular work piece 24. By way of example, it has been found that for work pieces ranging from about 1 to about 40 millimeters, commanding the servomotor 14 to drive opposing fingers 12 to a predetermined spacing which is about 1 millimeter less than the expected work piece dimension 24 will work adequately in the practice of the present invention.

It should be understood that if a recognizable position error is observed by the robotic control system 18, then a part is present between opposing fingers 12 and the magnitude of the gripping force applied to the work piece 24 is controllable by the software of the robotic control system controlling current supplied to the servomotor 14. Thus, the grip force applied to work piece 24 by opposing fingers 12 as a result of being driven by servomotor 14 can be adjusted by the robotic control system 18.

It will be understood by those skilled in the art that other types of sensor devices may be substituted for encoder 16 in the practice of the present invention. It is preferred that an encoder 16 be used. However, for example, a Hall sensor may be mounted on servomotor 14. In such manner, the Hall sensor could be used to quantify the rotation of servomotor 14. The microprocessor would then use the signals received from the Hall sensor to calculate the distance traveled by opposing fingers 12 and thus the actual position or spacing between opposing fingers 12. Other types of sensors could be used as well. Since the purpose of the sensor is to measure the position or spacing of the opposing fingers, the sensor could be attached directly to the motor for tracking rotational motion, or to another appropriate place in the mechanism such as the rack and pinion assembly or the opposing fingers 12 for tracking linear motion. A variety of sensors are available which can be used to track either rotational motion or linear motion such as, for example, resolvers, optical encoders, and sliding or rotary position sensor devices based on variable resistance, Hall effect, capacitance, or inductance. For purposes of this application, the terms "quantifying", "measuring" and "tracking" when used in conjunction rotational movement are intended to include the operation of each of these types of rotational motion sensors.

Similarly, the same terms "quantifying", "measuring" and "tracking" when used in conjunction linear motion are intended to include the operation of each of these types of linear motion sensors.

It will be understood by those skilled in the art that work pieces can also be acquired by opposing fingers 12 by positioning the opposing fingers 12 in an opening in the work piece and commanding the servomotor 14 to move opposing fingers 12 to a predetermined position or spacing which is greater than the dimension of the opening. If the work piece is successfully acquired, there will once again, as described above, be a position error caused by interference of the work piece preventing the opposing fingers 12 from attaining the predetermined position.

It will further be understood by those skilled in the art that a variation of the present invention can be practiced by replacing servomotor 14 with another type of drive such as a stepper motor, a hydraulically operated system, or pneumatically operated system. Such a system may not have the ability to control force. Also, hydraulically operated and pneumatically operated systems would be disadvantaged in that they would inherently be much larger.

From the foregoing, it will be seen that this invention is one well adapted to attain all of the ends and objects hereinabove set forth together with other advantages which are apparent and which are inherent to the method.

It will be understood that certain features and combinations are of utility and may be employed with reference to other features and subcombinations. This is contemplated by and is within the scope of the claims.

As many possible embodiments made of the invention without departing from the scope thereof, it is to be understood that all matter herein set forth and shown in the accompanying drawings is to be interpreted as illustrative and not in the limiting sense.

PARTS LIST

A predetermined position
B actual position
10 robotic gripper assembly
12 opposing fingers
14 servomotor
16 encoder
18 robotic control system or microprocessor
20 rack and pinion assembly
22 encoder wires
24 work piece or part
30 power amplifier
32 position counter
40 function block
42 function block
44 function block
46 decision block
50 function block
52 function block
54 function block
56 decision block
58 decision block

What is claimed is:

1. A method for determining if a robot gripper assembly has acquired a work piece, the robot gripper assembly including at least two opposing fingers, said method comprising the steps of:

(a) commanding the robot gripper assembly to close the at least two opposing fingers to a predetermined position to acquire the work piece, the predetermined position being less than an expected work piece dimension;

(b) quantifying an actual position of the at least two opposing fingers when movement of the at least two opposing fingers has been completed in response to said commanding step;

(c) comparing the actual position to the predetermined position to determine a position error; and (d) recognizing that a part has been acquired by the at least two opposing fingers if the position error is not zero.

2. A method as recited in claim 1 further comprising the step of:

recognizing that a work piece has not been acquired by the at least two opposing fingers if the position error is zero.

3. A method as recited in claim 1 wherein:

the robot gripper assembly is servomotor controlled, said quantifying step comprising the steps of (a) measuring rotation of the servomotor until movement of the at least two opposing fingers has been completed in response to said commanding step; and (b) using the rotation of the servomotor to determine the actual position of the at least two opposing fingers when movement of the at least two opposing fingers has been completed in response to said commanding step.

4. A method as recited in claim 3 wherein:

said measuring step is performed by counting encoder pulses from an encoder during said closing step until movement of the at least two opposing fingers has been completed, said encoder connected to a shaft of the servomotor.

5. A method for determining if a robot gripper assembly has acquired a work piece, the robot gripper assembly including at least two opposing fingers, said method comprising the steps of:

(a) moving the at least two opposing fingers to a predetermined position to acquire the work piece, the predetermined position being different than an expected work piece dimension, said moving step being performed in response to a command signal sent to the servomotor controlled robot gripper assembly;

(b) tracking an actual position of the at least two opposing fingers when movement of the at least two opposing fingers has been completed in the performance of said closing step using the number of rotations of said tracking step;

(d) comparing the actual position to the predetermined position to determine a position error; and (e) recognizing that a work piece has been acquired by the at least two opposing fingers if the position error is not zero.

6. A method as recited in claim 5 wherein:

said tracking step comprises (a) measuring rotation of a servomotor driving the at least two opposing fingers until movement of the at least two opposing fingers has been completed in response to said commanding step; and (b) using the rotation of the servomotor to determine the actual position of the at least two opposing fingers when movement of the at least two opposing fingers has been completed in response to said commanding step.

7. A method as recited in claim 6 wherein:

said measuring step is performed by counting encoder pulses from an encoder during said closing step until movement of the at least two opposing fingers has been completed, said encoder connected to a shaft of the servomotor.

8. A method for determining if a robot gripper assembly has acquired a work piece and for determining if the work piece is within dimension tolerances, the robot gripper assembly including at least two opposing fingers, said method comprising the steps of:

(a) closing the at least two opposing fingers to a predetermined position to acquire the work piece, the predetermined position being less than an expected work piece dimension tolerance range, said closing step being performed in response to a command signal sent to the servomotor controlled robot gripper assembly;

(b) tracking motion of the at least two opposing fingers during said closing step until movement of the at least two opposing fingers has been completed to determine an actual position;

(d) determining if the actual position is within the expected work piece dimension tolerance range to determine a position error; and (e) recognizing that a work piece has been acquired by the at least two opposing fingers if the actual position is greater than the predetermined position and recognizing that the work piece is dimensionally acceptable if the actual position is within the expected work piece dimension tolerance range.

9. A method as recited in claim 4 further comprising the step of:

recognizing that a work piece has not been acquired by the at least two opposing fingers if the predetermined position is achieved during said closing step.

10. A method as recited in claim 9 further comprising the step of:

recognizing that an unacceptable work piece has been acquired by the at least two opposing fingers if the actual position is greater than the predetermined position and the actual position is not within the expected work piece dimension tolerance range.

11. A method as recited in claim 8 wherein:

said tracking step comprises (a) measuring rotation of a servomotor driving the at least two opposing fingers until movement of the at least two opposing fingers has been completed in response to said commanding step; and (b) using the rotation of the servomotor to determine the actual position of the at least two opposing fingers when movement of the at least two opposing fingers has been completed in response to said commanding step.

12. A method as recited in claim 11 wherein:

said measuring step is performed by counting encoder pulses from an encoder during said closing step until movement of the at least two opposing fingers has been completed, said encoder connected to a shaft of the servomotor.

13. A method for determining if a servo controlled robot gripper assembly has acquired a work piece, the servomotor controlled robot gripper assembly including at least two opposing fingers, said method comprising the steps of:

(a) commanding the servomotor controlled robot gripper assembly to close the at least two opposing fingers to a predetermined position to acquire the work piece, the predetermined position being less than an expected work piece dimension;

(b) measuring a rotation quantity of the servomotor until movement of the at least two opposing fingers has been completed in response to said commanding step;

(c) using the rotation quantity to determine an actual position of the at least two opposing fingers when movement of the at least two opposing fingers has been completed in response to said commanding step;

(d) comparing the actual position to the predetermined position to determine a position error; and (e) recognizing that a work piece has been acquired by the at least two opposing fingers if the position error is not zero.

14. A method as recited in claim 13 further comprising the step of:

recognizing that a work piece has not been acquired by the at least two opposing fingers if the position error is zero.

15. A method as recited in claim 13 wherein:

said measuring step is performed counting encoder pulses from an encoder connected to a shaft of the servomotor.

16. A method as recited in claim 13 wherein:

said measuring step is performed counting encoder pulses from a hall sensor connected to the servomotor.

17. A method as recited in claim 13 wherein:

said measuring step is performed by counting encoder pulses from an encoder during said closing step until movement of the at least two opposing fingers has been completed, said encoder connected to a shaft of the servomotor.

18. A method for determining if a robot gripper assembly has acquired a work piece, the robot gripper assembly including at least two opposing fingers, said method comprising the steps of:

(a) commanding the robot gripper assembly to move the at least two opposing fingers to a predetermined position to acquire the work piece, the predetermined position being different than an expected work piece dimension;

(b) measuring an actual position of the at least two opposing fingers when movement of the at least two opposing fingers has been completed in response to said commanding step;

(c) comparing the actual position to the predetermined position to determine a position error; and (d) recognizing that a work piece has been acquired by the at least two opposing fingers if the position error is not zero.

* * * * *